(12) United States Patent
Adachi et al.

(10) Patent No.: US 8,946,948 B2
(45) Date of Patent: Feb. 3, 2015

(54) MOTOR WITH STATOR COVER FORMED BY OVERLAPPING TWO MEMBERS

(75) Inventors: Masaki Adachi, Kyoto (JP); Yoshiaki Oguma, Kyoto (JP); Yasuyuki Kaji, Kyoto (JP)

(73) Assignee: Nidec Corporation, Kyoto (JP)

( * ) Notice: Subject to any disclaimer, the term of this patent is extended or adjusted under 35 U.S.C. 154(b) by 351 days.

(21) Appl. No.: 13/457,862

(22) Filed: Apr. 27, 2012

(65) Prior Publication Data

US 2012/0319543 A1   Dec. 20, 2012

(30) Foreign Application Priority Data

Jun. 17, 2011 (JP) ................................ 2011-135497
Dec. 2, 2011 (JP) ................................ 2011-264492

(51) Int. Cl.
*H02K 5/00* (2006.01)
*H02K 5/10* (2006.01)
*H02K 11/00* (2006.01)
*H02K 7/14* (2006.01)
*H02K 5/128* (2006.01)

(52) U.S. Cl.
CPC .. *H02K 5/10* (2013.01); *H02K 7/14* (2013.01); *H02K 11/0068* (2013.01); *H02K 5/128* (2013.01)
USPC ............ 310/43; 310/45; 310/67 R; 310/68 R; 310/86; 310/87; 310/88; 310/89; 310/91; 310/194

(58) Field of Classification Search
CPC ........... H02K 5/10; H02K 5/128; H02K 7/14; H02K 11/00
USPC ......... 310/43, 45, 68 R, 86–89, 91, 194, 67 R
IPC ..................................... H02K 5/00,5/10, 11/00
See application file for complete search history.

(56) References Cited

U.S. PATENT DOCUMENTS

| | | | |
|---|---|---|---|
| 6,278,207 B1* | 8/2001 | Matsumoto | 310/88 |
| 6,333,576 B1* | 12/2001 | Ishikawa et al. | 310/85 |
| 6,394,767 B1* | 5/2002 | Matsumoto | 417/423.1 |
| 6,700,253 B1 | 3/2004 | Ohnuma et al. | |
| 7,667,359 B2* | 2/2010 | Lee et al. | 310/86 |
| 7,911,089 B2* | 3/2011 | Jang et al. | 310/43 |
| 8,506,264 B2* | 8/2013 | Horng et al. | 417/410.1 |
| 8,651,830 B2* | 2/2014 | Shen | 417/354 |

(Continued)

FOREIGN PATENT DOCUMENTS

| | | |
|---|---|---|
| CN | 1361937 A | 7/2002 |
| CN | 102638149 A | 8/2012 |

(Continued)

*Primary Examiner* — John K Kim
(74) *Attorney, Agent, or Firm* — Keating & Bennett, LLP

(57) ABSTRACT

A motor includes a cover made of a resin material. The cover includes a first annular portion arranged to extend in an annular shape above coils, a side wall portion arranged to extend downward from an outer circumferential portion of the first annular portion, and a second annular portion arranged to extend radially outward or radially inward from a lower end portion of the side wall portion along an upper surface of a circuit board. The side wall portion is arranged to extend in an axial direction while filling in gaps between teeth on a radially inner side of radially outer end surfaces of the teeth. The coils are covered by the cover to be protected from dust, water droplets, etc. The radially outer end surfaces of the teeth are exposed from the cover, and are thus arranged to be in radial proximity to a rotor magnet.

28 Claims, 18 Drawing Sheets

(56) References Cited

U.S. PATENT DOCUMENTS

| | | |
|---|---|---|
| 2004/0145250 A1* | 7/2004 | Kudo et al. ..................... 310/43 |
| 2005/0012416 A1* | 1/2005 | Huang et al. ................... 310/88 |
| 2005/0123423 A1* | 6/2005 | Weisser ..................... 417/423.7 |
| 2007/0085426 A1* | 4/2007 | Lee et al. ........................ 310/43 |
| 2007/0085431 A1* | 4/2007 | Hayakawa et al. ............ 310/90 |
| 2007/0126296 A1 | 6/2007 | Lee et al. |
| 2007/0145842 A1* | 6/2007 | Zhu et al. ........................ 310/88 |
| 2007/0241643 A1* | 10/2007 | Watanabe et al. .......... 310/67 R |
| 2012/0039729 A1* | 2/2012 | Horng et al. ................ 417/410.1 |
| 2012/0139387 A1* | 6/2012 | Hung et al. ............ 310/216.137 |
| 2012/0319543 A1* | 12/2012 | Adachi et al. ............... 310/68 R |

FOREIGN PATENT DOCUMENTS

| | | |
|---|---|---|
| JP | 2001-45695 A | 2/2001 |
| JP | 2007-110890 A | 4/2007 |
| JP | 2007-159393 A | 6/2007 |
| JP | 2007-174896 A | 7/2007 |

\* cited by examiner

MOTOR WITH STATOR COVER FORMED BY OVERLAPPING TWO MEMBERS

BACKGROUND OF THE INVENTION

1. Field of the Invention

The present invention relates to a motor.

2. Description of the Related Art

Motors are used in a variety of environments. Accordingly, structures arranged to protect coils, circuit boards, etc., of the motors from dust, water droplets, etc. have been known.

JP-A 2001-45695, for example, describes a structure in which a rotor of a motor is surrounded by a cover which is substantially cylindrical and has a bottom. JP-A 2007-110890 describes a structure in which a stator assembly is entirely covered with a waterproof protector. JP-A 2007-159393 describes a structure in which a stator assembly is arranged in an accommodating space inside a first cover, and the accommodating space is filled with a filler. JP-A 2007-174896 describes a structure in which a stator is arranged inside a casing.

SUMMARY OF THE INVENTION

Preferred embodiments of the present invention have been conceived to provide a structure which is able to protect coils from dust, water droplets, etc. while also allowing end surfaces of teeth to be arranged to be in close proximity to a rotor magnet.

A motor according to a preferred embodiment of the present invention includes a stationary portion and a rotating portion supported to be rotatable with respect to the stationary portion. The rotating portion preferably includes a shaft arranged to extend along a central axis extending in a vertical direction; a rotor holder including a cylindrical portion arranged to be coaxial with the central axis; and a rotor magnet arranged on an inner circumferential surface of the cylindrical portion. The stationary portion preferably includes a plurality of teeth arranged radially inward of the rotor magnet, and arranged to extend radially with respect to the central axis; coils each of which is wound on a separate one of the teeth; a bearing portion arranged to rotatably support the shaft; a bearing support portion arranged to hold the bearing portion; a base portion arranged to extend radially outward from the bearing support portion below the coils; a circuit board arranged on an upper portion of the base portion; and a cover made of, for example, a resin material. The cover preferably includes a first annular portion arranged to extend in an annular shape above the coils; a side wall portion arranged to extend downward from an outer circumferential portion of the first annular portion; and a second annular portion arranged to extend radially outward or radially inward from a lower end portion of the side wall portion along an upper surface of the circuit board. An inner circumferential portion of the first annular portion and one of the bearing support portion and a member directly or indirectly fixed to the bearing support portion are arranged to be in contact with each other, or arranged to be in close proximity to each other with a slight gap intervening therebetween. The second annular portion and one of the base portion, the bearing support portion, and a member directly or indirectly fixed to one of the base portion and the bearing support portion are arranged to be in contact with each other, or arranged to be in close proximity to each other with a slight gap intervening therebetween. The side wall portion is arranged to extend in an axial direction while filling in gaps between the teeth on a radially inner side of radially outer end surfaces of the teeth.

According to the above-described preferred embodiment, the coils are covered with the cover. The coils are thereby protected from dust, water droplets, etc. In addition, the radially outer end surface of each tooth is preferably exposed from the cover. Therefore, the radially outer end surface of each tooth can be arranged to be in close radial proximity to the rotor magnet.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the accompanying drawings. It is assumed herein that a vertical direction is defined as a direction in which a central axis of a motor extends, and that a side on which coils are arranged with respect to a base portion is defined as an upper side. The shape of each member or portion and relative positions of different members or portions will be described based on the above assumptions. It should be noted, however, that the above definitions of the vertical direction and the upper and lower sides are made simply for the sake of convenience of description, and should not be construed to restrict in any way the orientation of a motor according to any preferred embodiment of the present invention when in actual use.

First Preferred Embodiment

Figure 1:
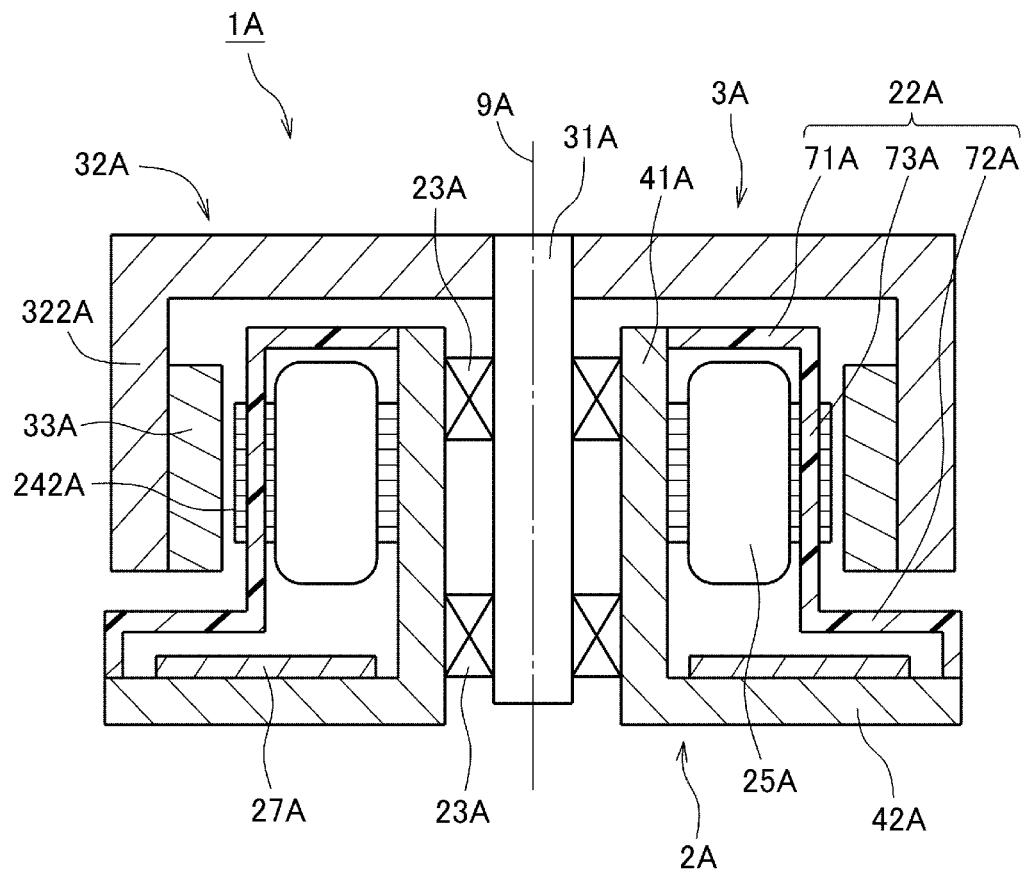
FIG. 1 is a vertical cross-sectional view of a motor according to a first preferred embodiment of the present invention.

FIG. 1 is a vertical cross-sectional view of a motor 1A according to a first preferred embodiment of the present invention. As illustrated in FIG. 1, the motor 1A includes a stationary portion 2A and a rotating portion 3A. The rotating portion 3A is supported to be rotatable with respect to the stationary portion 2A.

The rotating portion 3A preferably includes a shaft 31A, a rotor holder 32A, and a rotor magnet 33A. The shaft 31A is arranged to extend along a central axis 9A. The shaft 31A is preferably rotatably supported by bearing portions 23A, which will be further described below. The rotor holder 32A preferably includes a cylindrical portion 322A arranged to be coaxial or substantially coaxial with the central axis 9A. The rotor magnet 33A is arranged on an inner circumferential surface of the cylindrical portion 322A.

The stationary portion 2A preferably includes a plurality of teeth 242A, coils 25A, the bearing portions 23A, a bearing support portion 41A, a base portion 42A, a circuit board 27A, and a cover 22A. The teeth 242A are arranged radially inward of the rotor magnet 33A. The teeth 242A are arranged to extend radially outward with respect to the central axis 9A. Each coil 25A is wound on a separate one of the teeth 242A. Each bearing portion 23A is held by the bearing support portion 41A. The base portion 42A is arranged to extend radially outward from the bearing support portion 41A below the coils 25A. The circuit board 27A is arranged on an upper portion of the base portion 42A. The coils 25A and the circuit board 27A are covered with the cover 22A, which is preferably made of a resin material.

The cover 22A preferably includes a first annular portion 71A, a second annular portion 72A, and a side wall portion 73A. The first annular portion 71A is a portion which is arranged to extend in an annular shape above the coils 25A. The second annular portion 72A is a portion which is arranged to extend in an annular shape above the circuit board 27A. The side wall portion 73A is arranged to join an outer circumferential portion of the first annular portion 71A and an inner circumferential portion of the second annular portion 72A to each other.

In other words, the side wall portion 73A is arranged to extend axially downward from the outer circumferential portion of the first annular portion 71A. The second annular portion 72A is arranged to extend radially outward from a lower end portion of the side wall portion 73A along an upper surface of the circuit board 27A.

An inner circumferential portion of the first annular portion 71A is preferably arranged to be in contact with the bearing support portion 41A, or arranged to be in close proximity to the bearing support portion 41A with a slight gap intervening therebetween. In addition, an outer circumferential portion of the second annular portion 72A is arranged to be in contact with the base portion 42A, or arranged to be in close proximity to the base portion 42A with a slight gap intervening therebetween. Note, however, that the inner circumferential portion of the first annular portion 71A may also preferably be arranged to be in contact with another member fixed to the bearing support portion 41A, or arranged to be in close proximity to this member with a slight gap intervening therebetween. Also note that the second annular portion 72A may also preferably be arranged to be in contact with another member fixed to the base portion 42A, or arranged to be in close proximity to this member with a slight gap intervening therebetween.

In the motor 1A, the coils 25A, and the circuit board 27A are preferably covered with the cover 22A, so that the coils 25A and an electronic circuit on the circuit board 27A are protected from dust, water droplets, etc.

The side wall portion 73A is arranged radially inward of radially outer end surfaces of the teeth 242A. The side wall portion 73A is arranged to extend in an axial direction while filling in gaps between the teeth 242A. Accordingly, the radially outer end surface of each tooth 242A is exposed from the cover 22A. The radially outer end surface of each tooth 242A is thus allowed to be in close radial proximity to the rotor magnet 33A.

Note that the second annular portion may be arranged to extend radially inward from the lower end portion of the side wall portion along the upper surface of the circuit board. Also note that the inner circumferential portion of the first annular portion may be arranged to be in contact with a member directly or indirectly fixed to the bearing support portion, or arranged to be in close proximity to this member with a slight gap intervening therebetween. Also note that the second annular portion may be arranged to be in contact with one of the base portion, the bearing support portion, and a member directly or indirectly fixed to one of the base portion and the bearing support portion, or arranged to be in close proximity to one of the base portion, the bearing support portion, and the member directly or indirectly fixed to one of the base portion and the bearing support portion with a slight gap intervening therebetween.

Second Preferred Embodiment

Next, a second preferred embodiment of the present invention will now be described below.

A motor according to the present preferred embodiment is a fan motor arranged to generate cooling air currents and which is preferably installed in a device used outdoors, such as a server, a router, a communication base, a switch device, or the like. Note, however, that motors according to other preferred embodiments of the present invention may be motors used in other applications than fans. Also note that motors according to other preferred embodiments of the present invention may be installed in transportation apparatuses, such as automobiles, or may be installed in household electrical appliances used indoors, office automation appliances, medical appliances, or the like.

Figure 2:
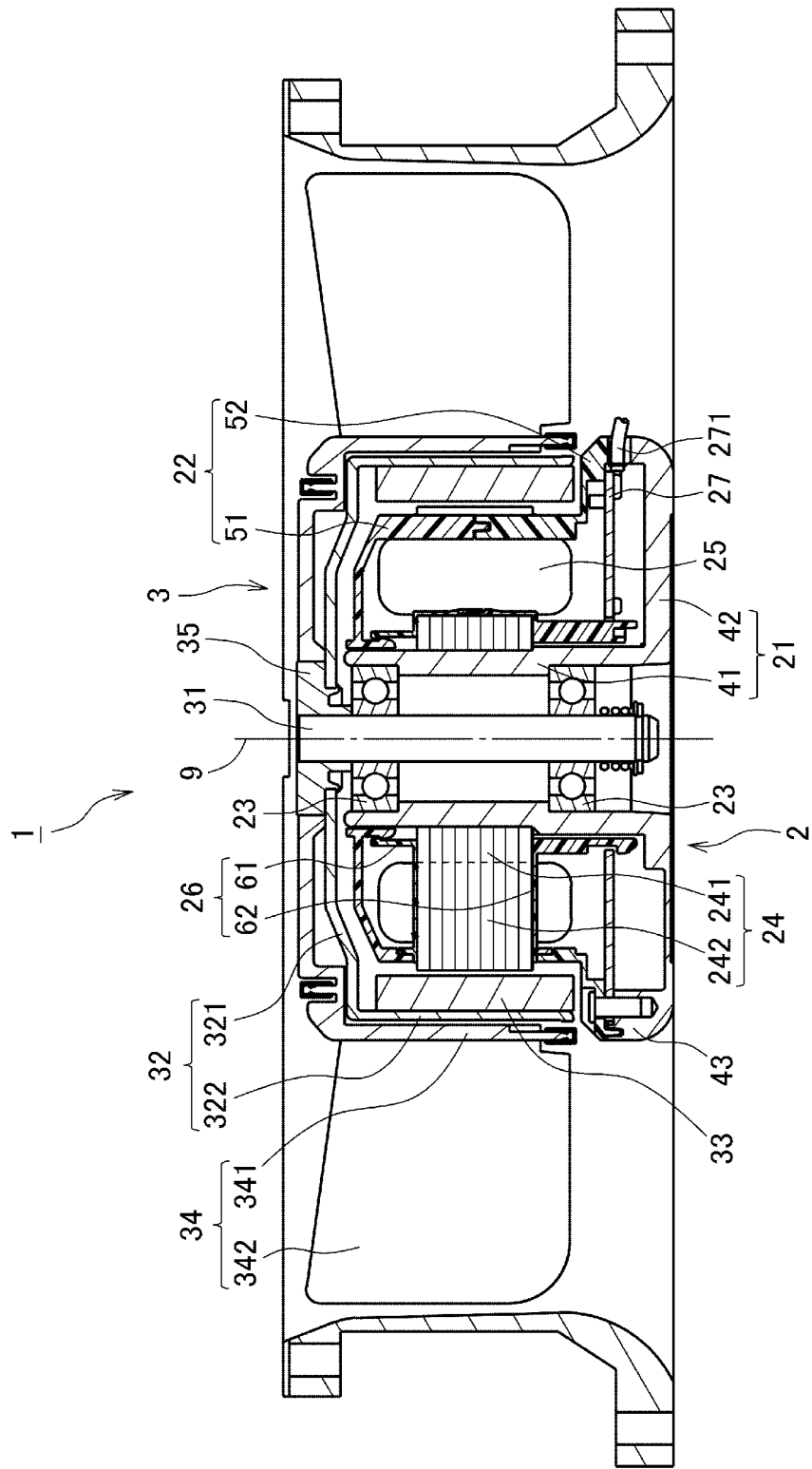
FIG. 2 is a vertical cross-sectional view of a motor according to a second preferred embodiment of the present invention.
Figure 3:
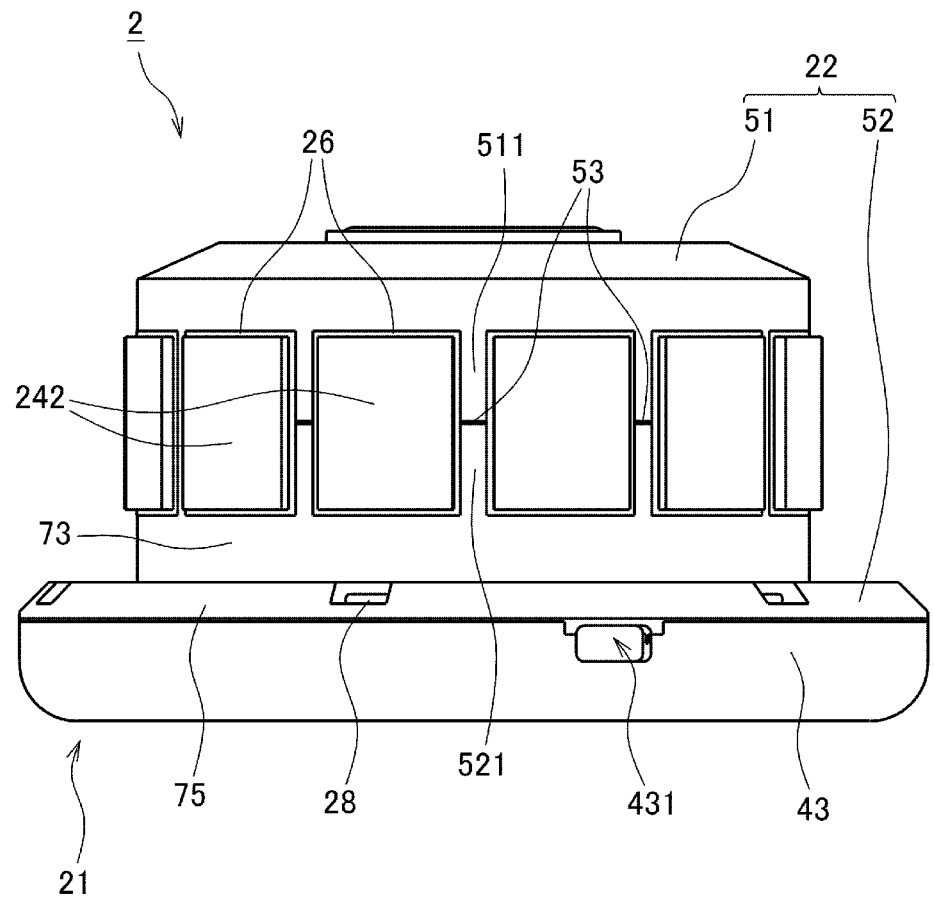
FIG. 3 is a side view of a stationary portion according to the second preferred embodiment.
Figure 4:
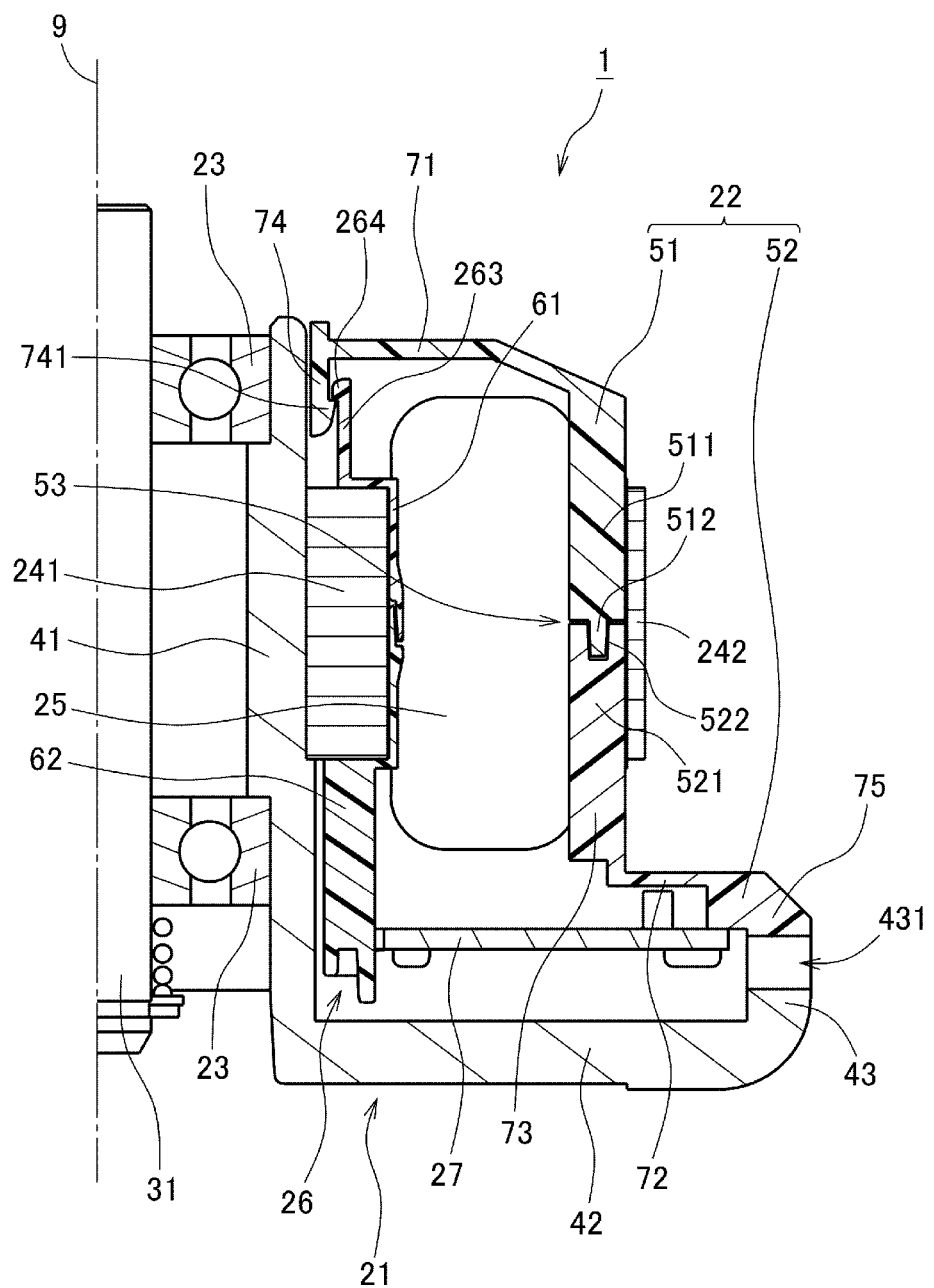
FIG. 4 is a partial vertical cross-sectional view of the motor according to the second preferred embodiment.
Figure 5:
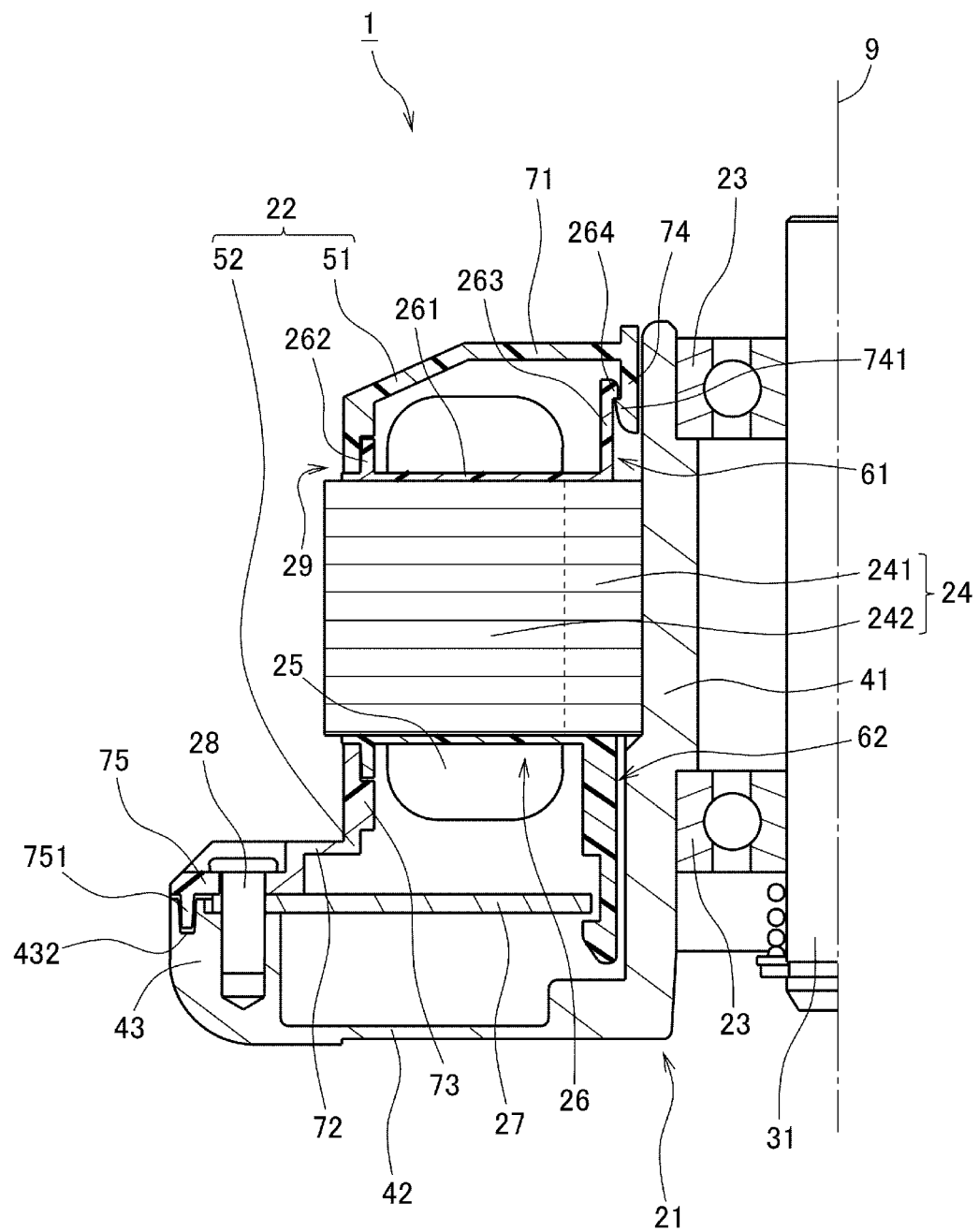
FIG. 5 is a partial vertical cross-sectional view of the motor according to the second preferred embodiment.

FIG. 2 is a vertical cross-sectional view of a motor 1 according to the present preferred embodiment. As illustrated in FIG. 2, the motor 1 includes a stationary portion 2 and a rotating portion 3. The stationary portion 2 is fixed to a frame of an apparatus which is to be driven. The rotating portion 3 is supported to be rotatable with respect to the stationary portion 2. FIG. 3 is a side view of the stationary portion 2. FIGS. 4 and 5 are each a partial vertical cross-sectional view of the motor 1. In the following description, references will be made to FIGS. 3 to 5 as well as FIG. 2 as appropriate.

The stationary portion 2 according to the present preferred embodiment preferably includes a housing 21, a cover 22, bearing portions 23, a stator core 24, coils 25, an insulator 26, and a circuit board 27.

The housing 21 is preferably a member which is arranged to support the bearing portions 23, the stator core 24, and the circuit board 27. The housing 21 may be made of a metal, such as, for example, aluminum, or may be made of other materials, such as, for example, a resin material. The housing 21 preferably includes a bearing support portion 41 and a base portion 42. The bearing support portion 41 is preferably a substantially cylindrical portion which is arranged to be coaxial or substantially coaxial with a central axis 9. The base portion 42 is preferably a substantially plate-shaped portion which is arranged to extend radially outward from a lower end portion of the bearing support portion 41. Note that the terms "radial direction", "radial", and "radially" as used herein refer to directions perpendicular or substantially perpendicular to the central axis. An outer circumferential portion of the base portion 42 includes an annular rest portion 43 arranged to project upward.

The cover 22 is preferably arranged radially outward of the bearing support portion 41 and above the base portion 42. The cover 22 according to the present preferred embodiment is preferably defined by a first cover member 51 and a second cover member 52, each of which is preferably made of, for example, a resin material. The coils 25 and the circuit board 27 are accommodated in an annular space defined between the housing 21 and the cover 22. In addition, an upper side and a radially outer side of the coils 25 and the circuit board 27 are covered with the cover 22. The coils 25 and an electronic circuit on the circuit board 27 are thus protected or substantially protected from dust, water droplets, etc.

A more detailed structure of the cover 22 will be described below.

The bearing portions 23 are a mechanism arranged to rotatably support a shaft 31, which is included in the rotating portion 3. Each bearing portion 23 is preferably held by an inner circumferential surface of the bearing support portion 41 of the housing 21. Ball bearings arranged to rotate outer and inner races relative to each other through balls are used as the bearing portions 23 according to the present preferred embodiment. Note, however, that other types of bearings, such as, for example, plain bearings, fluid bearings, etc., may be used instead of the ball bearings if so desired.

The stator core 24 and the coils 25 together define an armature arranged to generate magnetic flux in accordance with drive currents. The stator core 24 according to the present preferred embodiment is preferably defined by laminated steel sheets, that is, electromagnetic steel sheets, such as, for example, silicon steel sheets, placed one upon another in an axial direction. However, any other type of stator could be used if so desired. Note that the terms "axial direction", "axial", and "axially" as used herein refer to directions along the central axis. The stator core 24 preferably includes an annular core back 241 and a plurality of teeth 242 arranged to project radially outward from the core back 241. The core back 241 is preferably fixed to an outer circumferential surface of the bearing support portion 41. The teeth 242 are preferably arranged at regular intervals in a circumferential direction with respect to the central axis 9. The teeth 242 are arranged to extend radially with respect to the central axis 9.

The insulator 26 is attached to the teeth 242 of the stator core 24. That is, the insulator 26 is fixed indirectly to the bearing support portion 41 of the housing 21 through the stator core 24. The insulator 26 according to the present preferred embodiment is preferably defined by a pair of resin members 61 and 62, which are arranged above and below the teeth 242, respectively. The upper resin member 61 includes portions each of which is preferably arranged substantially in the shape of the letter "U" with a downward opening. The lower resin member 62 preferably includes portions each of which is arranged substantially in the shape of the letter "U" with an upward opening. The resin members 61 and 62 are arranged to cover the teeth 242 from above and below, respectively, with the result that each tooth 242 is covered by a substantially tubular portion of the insulator 26.

Referring to FIG. 5, the insulator 26 preferably includes tubular portions 261, first edge portions 262, and a second edge portion 263. Each tubular portion 261 is arranged to cover an upper surface, a lower surface, and side surfaces of a separate one of the teeth 242. Each coil 25 is wound around a separate one of the tubular portions 261. The tubular portion 261 is arranged to intervene between the tooth 242 and the coil 25 to provide electrical isolation between the tooth 242 and the coil 25. Each first edge portion 262 is arranged to extend away from a separate one of the teeth 242 on a radially outer side of the coil 25 wound on the tooth 242. The second edge portion 263 is arranged to extend away from each tooth 242 on a radially inner side of the coil 25 wound on the tooth 242.

The circuit board 27 is a board on which the electronic circuit, which is configured to supply the drive currents to the coils 25, is mounted. The circuit board 27 is preferably arranged below the coils 25. An outer circumferential portion of the circuit board 27 is fixed to an upper surface of the annular rest portion 43 of the base portion 42. As illustrated in FIG. 2, a lead wire 271, which is arranged to exchange electrical signals between the circuit board 27 and an external device (not shown), is connected to the circuit board 27. The lead wire 271 is drawn out of the housing 21 through a cut 431 defined in the annular rest portion 43.

The rotating portion 3 according to the present preferred embodiment preferably includes the shaft 31, a rotor holder 32, a plurality of rotor magnets 33, and an exterior unit 34.

The shaft 31 is preferably a substantially columnar member which is arranged to extend in the vertical direction along the central axis 9. The shaft 31 is preferably made of, for example, of a metal such as stainless steel. The shaft 31 is arranged to rotate about the central axis 9 while being supported by the bearing portions 23. An annular bushing 35 is attached to an upper end portion of the shaft 31.

The rotor holder 32 is a member which is arranged to rotate together with the shaft 31 while holding the rotor magnets 33. In the present preferred embodiment, the rotor holder 32 is preferably fixed to the shaft 31 through the bushing 35. Note, however, that the rotor holder 32 may alternatively be directly fixed to the shaft 31 if so desired. The rotor holder 32 preferably includes a cover portion 321 and a cylindrical portion 322. The cover portion 321 is preferably arranged to extend radially outward from the bushing 35 to substantially assume the shape of a plate. The cylindrical portion 322 is preferably arranged to extend downward from an outer circumferential portion of the cover portion 321, and arranged to be coaxial or substantially coaxial with the central axis 9.

Each of the rotor magnets 33 is fixed to an inner circumferential surface of the cylindrical portion 322 of the rotor holder 32. A radially inner surface of each rotor magnet 33 is arranged to define a pole surface which is to be opposed to an end surface of each tooth 242. The rotor magnets 33 are preferably arranged at regular intervals in the circumferential direction such that north pole surfaces and south pole surfaces alternate with each other about the circumference. Note that a single annular magnet on which north and south poles alternate with each other in the circumferential direction may alternatively be used in place of the plurality of rotor magnets 33 if so desired.

The exterior unit 34 preferably includes an impeller support portion 341 and an impeller 342 arranged on an outer circumference of the impeller support portion 341. The impeller support portion 341 is preferably a cup portion substantially in the shape of a covered cylinder and which is arranged to support the impeller 342. An upper surface of the cover portion 321 and an outer circumferential surface of the cylindrical portion 322 of the rotor holder 32 are covered with the impeller support portion 341. In the present preferred embodiment, an inner circumferential portion of the impeller support portion 341 is fixed to the bushing 35. The impeller 342 includes a plurality of blades arranged in the circumferential direction.

Regarding the motor 1 having the above-described structure, once the drive currents are supplied to the coils 25, radial magnetic flux is generated around the teeth 242 of the stator core 24. Then, interaction between the radial magnetic flux of the teeth 242 and the radial magnetic flux of the rotor magnets 33 produces a circumferential torque, so that the rotating portion 3 is caused to rotate about the central axis 9 with respect to the stationary portion 2. Rotation of the rotating portion 3 causes the impeller 342 to generate axial air currents.

As illustrated in FIGS. 4 and 5, the cover 22 preferably includes a first annular portion 71, a second annular portion 72, and a side wall portion 73. The first annular portion 71 is a portion which is arranged to extend in an annular shape to cover an upper side of the coils 25. The second annular portion 72 is a portion which is arranged to extend in an annular shape to cover an upper side of the outer circumferential portion of the circuit board 27 and its vicinity. The side wall portion 73 is a substantially cylindrical portion which is arranged to extend in the axial direction to join an outer circumferential portion of the first annular portion 71 and an inner circumferential portion of the second annular portion 72 to each other.

That is, the side wall portion 73 is arranged to extend axially downward from the outer circumferential portion of the first annular portion 71. The second annular portion 72 is arranged to extend radially outward from a lower end portion of the side wall portion 73 along an upper surface of the circuit board 27.

In the present preferred embodiment, the first annular portion 71 and an upper portion of the side wall portion 73 are included in the first cover member 51, while the second annular portion 72 and a lower portion of the side wall portion 73 are included in the second cover member 52. Boundaries 53 between the first and second cover members 51 and 52 are therefore arranged in the side wall portion 73.

An inner circumferential portion of the first annular portion 71 preferably includes an inner wall portion 74 arranged to extend in the vertical direction to substantially assume the shape of a cylinder. The inner wall portion 74 is arranged to surround an upper end portion of the bearing support portion 41. The outer circumferential surface of the bearing support portion and an inner circumferential surface of the inner wall portion 74 are arranged to be in contact with each other, or arranged to be in close proximity to each other with a slight gap intervening therebetween. This contributes to preventing dust, water droplets, etc. from entering into the cover 22 through a gap between the bearing support portion 41 and the inner wall portion 74.

Moreover, as illustrated in FIGS. 4 and 5, in the present preferred embodiment, a lower end portion of the inner wall portion 74 and an upper end portion of the second edge portion 263 of the insulator 26 are arranged to overlap with each other in a radial direction. That is, the inner wall portion 74 is arranged between the bearing support portion 41 and the second edge portion 263. A surrounding area of the upper end portion of the bearing support portion 41 is thereby made more dustproof and waterproof.

Furthermore, in the present preferred embodiment, the lower end portion of the inner wall portion 74 preferably includes a claw portion 741 arranged to project radially outward, while the upper end portion of the second edge portion 263 of the insulator 26 preferably includes a claw portion 264 arranged to project radially inward. The claw portions 741 and 264 are arranged in engagement with each other. The insulator 26 and the first cover member 51 are thereby fixed to each other. Use of the above engagement eliminates a need to use an adhesive to fix the insulator 26 and the first cover member 51 to each other. It is possible to fix the insulator 26 and the first cover member 51 to each other easily by simply bringing the insulator 26 and the first cover member 51 into axial engagement with each other.

Note that the claw portion may be arranged in only one of the insulator 26 and the first cover member 51. That is, the claw portion arranged in one of the insulator 26 and the first cover member 51 may be brought into engagement with a receiver, such as, for example, a hole or a shoulder, which is arranged in the other of the insulator 26 and the first cover member 51. In the present preferred embodiment, each of the claw portions 741 and 264 functions as the receiver for the other claw portion.

An outer circumferential portion of the second annular portion 72 preferably includes an annular edge portion 75 arranged to project axially downward. Meanwhile, the outer circumferential portion of the base portion 42 includes the annular rest portion 43 arranged to project upward. As illustrated in FIG. 5, in the present preferred embodiment, the outer circumferential portion of the circuit board 27 is preferably held between a lower surface of the annular edge portion 75 and the upper surface of the annular rest portion 43. In addition, the annular edge portion 75, the circuit board 27, and the annular rest portion 43 are preferably fixed to one another through, for example, a plurality of screws 28 arranged in the circumferential direction.

A lower surface of an outer circumferential portion of the annular edge portion 75 and an upper surface of an outer circumferential portion of the annular rest portion 43 are preferably arranged to be in contact with each other or arranged to be in close proximity to each other with a slight gap intervening therebetween. This contributes to preventing dust, water droplets, etc. from entering into the cover 22 through a gap between the annular edge portion 75 and the annular rest portion 43. Moreover, in the present preferred embodiment, a raised portion 751 defined in the lower surface of the annular edge portion 75 and a recessed portion 432 defined in the upper surface of the annular rest portion 43 are mated with each other. The gap between the annular edge portion 75 and the annular rest portion 43 is thereby made more dustproof and waterproof.

Furthermore, as illustrated in FIG. 5, in the present preferred embodiment, the upper surface of the circuit board 27 and the lower surface of the annular edge portion 75 are arranged to be in surface contact with each other around each screw 28. A surrounding area of each screw 28 is thereby made more dustproof and waterproof.

Furthermore, in the present preferred embodiment, the annular edge portion 75, the circuit board 27, and the annular rest portion 43 are fixed to one another through the screws 28.

That is, each screw 28 is arranged to function as both a first fixing device to fix the circuit board 27 to the annular rest portion 43, and a second fixing device to fix the annular edge portion 75 to the annular rest portion 43. This leads to a reduced number of parts as compared to the case where the first and second fixing devices are provided separately.

In the vicinity of the cut 431 through which the lead wire 271 is arranged to pass, the annular rest portion 43 and the annular edge portion 75 are prone to receive pressures acting in mutually opposite directions by being pressed by the lead wire 271. In view of this consideration, in the present preferred embodiment, the cut 431 is arranged between a pair of adjacent ones of the screws 28 as illustrated in FIG. 3. This contributes to preventing the gap between the annular rest portion 43 and the annular edge portion 75 from increasing in width in the vicinity of the cut 431.

The side wall portion 73 is arranged to extend in the axial direction between the teeth 242. In the present preferred embodiment, the first cover member 51 preferably includes a plurality of first projecting portions 511 arranged to extend axially downward along and between the teeth 242. In addition, the second cover member 52 preferably includes a plurality of second projecting portions 521 arranged to extend axially upward along and between the teeth 242. The first and second cover members 51 and 52 are attached in such a manner that the teeth 242 are sandwiched by the first and second cover members 51 and 52 from above and below. The boundaries 53 between the first and second cover members 51 and 52 are therefore arranged in gaps between the teeth 242.

The side wall portion 73 is arranged to be in contact with each first edge portion 262 of the insulator 26, or arranged to be in close proximity to each first edge portion 262 with a slight gap intervening therebetween. That is, in the present preferred embodiment, the side wall portion 73 and the insulator 26 are arranged to fill in the gaps between the teeth 242. This contributes to preventing dust, water droplets, etc. from entering into the cover 22 through a gap between the side wall portion 73 and the insulator 26.

As illustrated in FIG. 5, in the present preferred embodiment, the side wall portion 73 and each first edge portion 262 of the insulator 26 are preferably arranged to overlap with each other in the radial direction at a boundary 29 between the side wall portion 73 and the insulator 26. In this case, even if an axial dimensional error of any of the cover 22, the insulator 26, and the teeth 242 occurs, a radially extending through gap is unlikely to be defined between the side wall portion 73 and the insulator 26. Accordingly, the boundary 29 is made more dustproof and waterproof.

Furthermore, in the present preferred embodiment, the boundaries 53 between the first and second cover members 51 and 52 are arranged at substantially the same height as that of an axial middle of each of the teeth 242. If either each first projecting portion 511 or each second projecting portion 521 is arranged to have an extra length, a dimensional error will be more likely to occur in that projecting portion during a molding process. In view of this consideration, in the present preferred embodiment, each first projecting portion 511 and each second projecting portion 521 are arranged to have substantially the same axial length. The lengths of both the first projecting portions 511 and the second projecting portions 521 are thus restricted so that a dimensional error will be less likely to occur during the molding process.

As illustrated in FIG. 4, in the present preferred embodiment, a lower end portion of each first projecting portion 511 includes a raised portion 512 arranged to project downward, while an upper end portion of each second projecting portion 521 includes a recessed portion 522. The raised portion 512 and the recessed portion 522 are mated with each other at each boundary 53 between the first and second cover members 51 and 52. The lower end portion of the first projecting portion 511 and the upper end portion of the second projecting portion 521 are thus arranged to overlap with each other in the radial direction at each boundary 53. Therefore, even if an axial dimensional error of any of the cover 22, the insulator 26, and the teeth 242 occurs, a radially extending through gap is unlikely to be defined at any boundary 53. Each boundary 53 is thus made more dustproof and waterproof.

Note that each first projecting portion 511 and each second projecting portion 521 may be arranged to include a recessed portion and a raised portion, respectively, and that the recessed portion and the raised portion may be mated with each other. That is, each boundary 53 can be made more dustproof and waterproof by mating the raised portion arranged in one of the first and second cover members 51 and 52 with the recessed portion arranged in the other of the first and second cover members 51 and 52 at the boundary 53.

The side wall portion 73, which includes the first and second projecting portions 511 and 521, is arranged radially inward of the end surfaces of the teeth 242. Accordingly, the end surface of each tooth 242 is exposed outside the cover 22. This enables the end surfaces of the teeth 242 to be radially opposed to the radially inner surfaces of the rotor magnets 33 without intervention of the cover 22. Thus, the end surfaces of the teeth 242 and the radially inner surfaces of the rotor magnets 33 can be arranged to be in radial proximity to each other to improve magnetic properties of the motor 1 while securing dustproofness and waterproofness.

Note that the end surface of each of the teeth 242 may, for example, be covered with a waterproof film in the case where there is a need to protect the end surface of each tooth 242 from dust, water droplets, etc.

Third Preferred Embodiment

Next, a third preferred embodiment of the present invention will now be described below with focus on differences from the second preferred embodiment.

Figure 6:
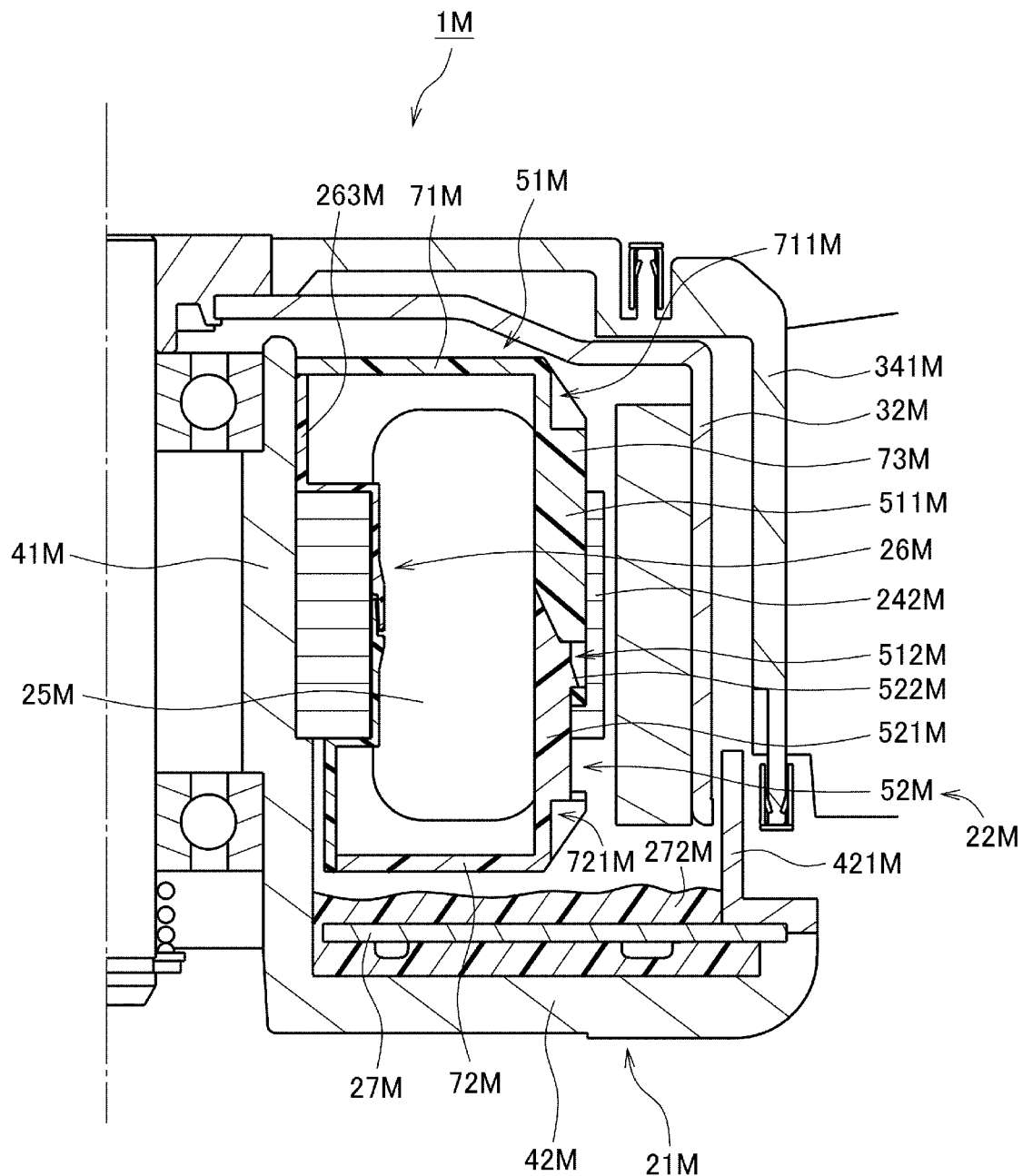
FIG. 6 is a partial vertical cross-sectional view of a motor according to a third preferred embodiment of the present invention.
Figure 7:
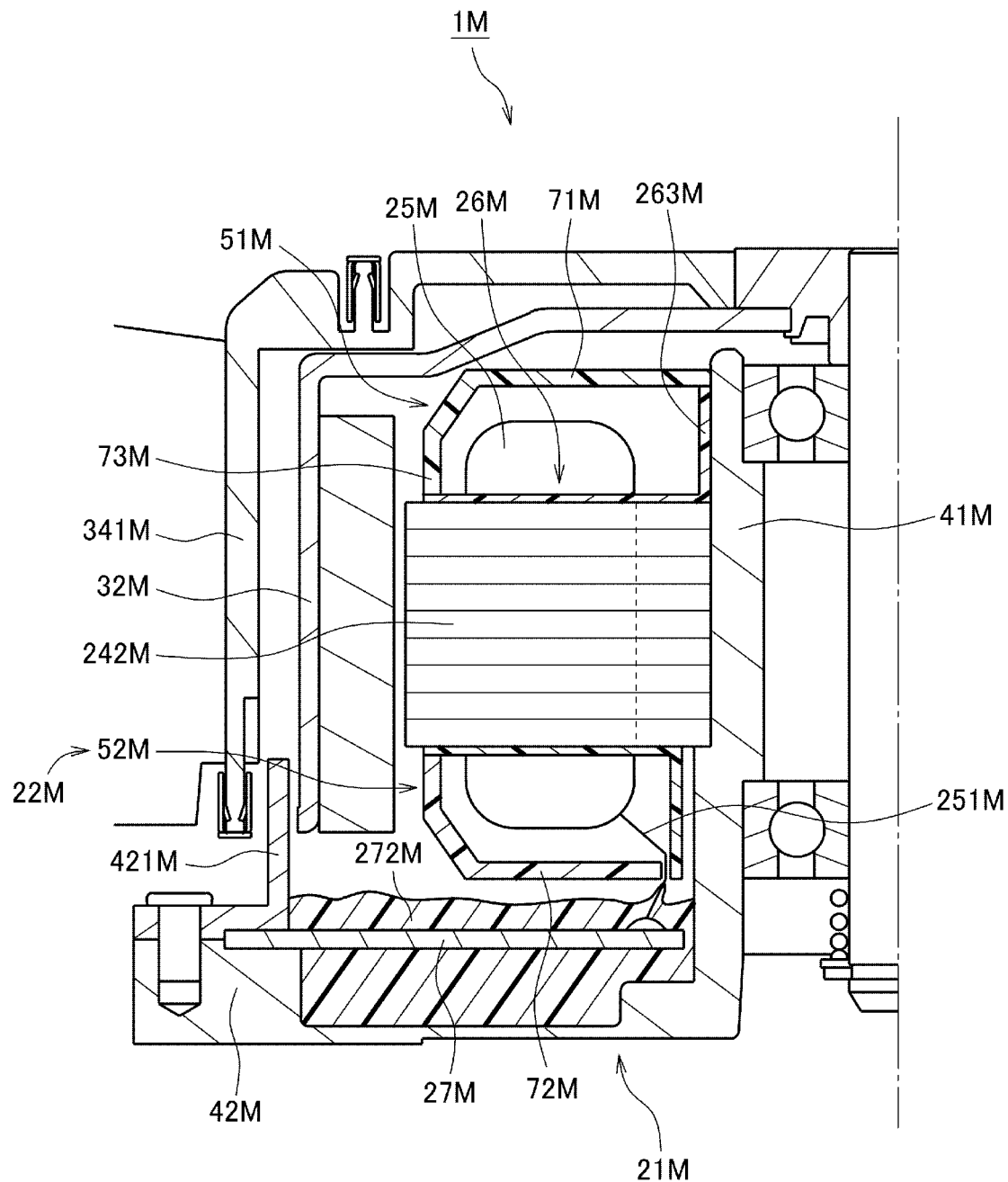
FIG. 7 is a partial vertical cross-sectional view of the motor according to the third preferred embodiment.

FIGS. 6 and 7 are each a partial vertical cross-sectional view of a motor 1M according to the third preferred embodiment. As illustrated in FIGS. 6 and 7, in the present preferred embodiment, a second annular portion 72M of a cover 22M is preferably arranged to extend radially inward from a lower end portion of a side wall portion 73M along an upper surface of a circuit board 27M. In addition, the second annular portion 72M is arranged to extend in an annular shape below coils 25M and above the circuit board 27M.

In the present preferred embodiment, a first annular portion 71M and an upper portion of the side wall portion 73M are preferably included in a first cover member 51M, while the second annular portion 72M and a lower portion of the side wall portion 73M are preferably included in a second cover member 52M. Each of first projecting portions 511M of the first cover member 51M includes a radially extending through hole 512M defined in the vicinity of a lower end portion thereof. Meanwhile, each of second projecting portions 521M of the second cover member 52M preferably includes a radially projecting claw portion 522M defined in the vicinity of an upper end portion thereof. The claw portion 522M is arranged in engagement with the through hole 512M. Use of this engagement eliminates a need to use an adhesive to fix the first and second cover members 51M and 52M to each other. It is possible to fix the first and second cover members 51M and 52M to each other easily by simply bringing the first and second cover members 51M and 52M into axial engagement with each other.

An inner circumferential portion of the first annular portion 71M is arranged to be in contact with an outer circumferential surface of a bearing support portion 41M, or arranged to be in close proximity to the outer circumferential surface of the bearing support portion 41M with a slight gap intervening therebetween. This contributes to preventing dust, water droplets, etc. from entering into the cover 22M through a gap between the bearing support portion 41M and the first annular portion 71M. Moreover, an upper end portion of a second edge portion 263M of an insulator 26M is arranged to be in contact with a lower surface of the first annular portion 71M, or arranged to be in close proximity to the lower surface of the first annular portion 71M with a slight gap intervening therebetween. This contributes to preventing dust, water droplets, etc. from entering into the cover 22M through a gap between the second edge portion 263M and the first annular portion 71M.

Furthermore, an inner circumferential portion of the second annular portion 72M is preferably arranged to be in contact with an outer circumferential surface of the second edge portion 263M of the insulator 26M, or arranged to be in close proximity to the outer circumferential surface of the second edge portion 263M with a slight gap intervening therebetween. This contributes to preventing dust, water droplets, etc. from entering into the cover 22M through a gap between the second edge portion 263M and the second annular portion 72M.

As described above, in the present preferred embodiment, a substantially closed space is defined by the insulator 26M and the cover 22M. The coils 25M are accommodated in this space. Accordingly, it is possible to use the insulator 26M and the cover 22M in combination with, for example, a variety of types of housings 21M with base portions 42M having different sizes, without a need to modify the shapes of the insulator 26M and the cover 22M. That is, the insulator 26M and the cover 22M have improved versatility, providing increased adaptability to changes of product designs.

Furthermore, in the present preferred embodiment, the circuit board 27M is preferably covered with a potting material 272M. The circuit board 27M is thereby protected from dust, water droplets, etc. For example, a silicone, an epoxy resin, a polyurethane resin, or the like is used as the potting material 272M. The potting material 272M is arranged to cover at least portions of the upper surface and a lower surface of the circuit board 27M on which an electronic circuit is arranged.

Furthermore, as illustrated in FIG. 7, the potting material 272M is preferably arranged to rise along a conducting wire 251M which is soldered onto the circuit board 27M. In this case, even if a portion of an insulating film which coats the conducting wire 251M is melted at the time of the soldering, with the result that a portion of the conducting wire 251 is exposed thereat, the exposed portion of the conducting wire 251M will still be protected by the potting material 272 in place of the insulating film.

Furthermore, the base portion 42M according to the present preferred embodiment preferably includes an annular bank portion 421M arranged to project upward. The bank portion 421M is preferably arranged to surround the potting material 272M. When the potting material 272M is provided, the potting material 272M is poured in a fluid state into an inside of the bank portion 421M. At this time, the bank portion 421M prevents the potting material 272M from spreading radially outward. This makes it possible to cover the circuit board 27M with the potting material 272M while limiting the amount of the potting material 272M used. The potting material 272M is thereafter hardened inside the bank portion 421M.

Furthermore, as illustrated in FIGS. 6 and 7, the bank portion 421M according to the present preferred embodiment is preferably arranged to project upward to assume an annular shape, and arranged to overlap with a side surface of an impeller support portion 341M in the radial direction. In addition, the bank portion 421M and the impeller support portion 341M are preferably arranged to together define a labyrinth structure. This contributes to preventing dust, water droplets, etc. from intruding radially inward through an axial gap between the impeller support portion 341M and the base portion 42M. Furthermore, as illustrated in FIG. 6, an upper end portion of the bank portion 421M is arranged between a rotor holder 32M and the impeller support portion 341M in the radial direction. The upper end portion of the bank portion 421M is preferably arranged at a level higher axially than that of each of a lower end portion of the impeller support portion 341M and a lower end portion of the rotor holder 32M as illustrated in FIG. 6. This contributes to more effectively preventing dust, water droplets, etc. from intruding radially inward beyond the rotor holder 32M.

Furthermore, in the present preferred embodiment, a radially inner surface of each first projecting portion 511M is arranged radially inward of an inner circumferential surface of another portion of the side wall portion 73M. Accordingly, a radially outer edge portion of the first annular portion 71M is arranged to include recessed portions 711M defined in portions thereof. The recessed portions 711M are each recessed radially inward, and are arranged at positions above the first projecting portions 511M, i.e., at positions above gaps between teeth 242M. If the recessed portions 711M described above were not provided, the first cover member 51M would have a locally increased thickness at the position above each first projecting portion 511M. In this case, when a resin is hardened during an injection molding process, a sink mark of the resin might cause an inclination of the first projecting portion 511M.

In the present preferred embodiment, the inclusion of the recessed portions 711M in the first cover member 51M contributes to preventing an unwanted effect of a sink mark on product precision as described above. In the present preferred embodiment, the second cover member 52M also includes recessed portions 721M defined therein for a similar purpose. The recessed portions 721M are each recessed radially inward, and are arranged at positions axially below the second projecting portions 521M, i.e., at positions below the gaps between the teeth 242M.

Figure 8:
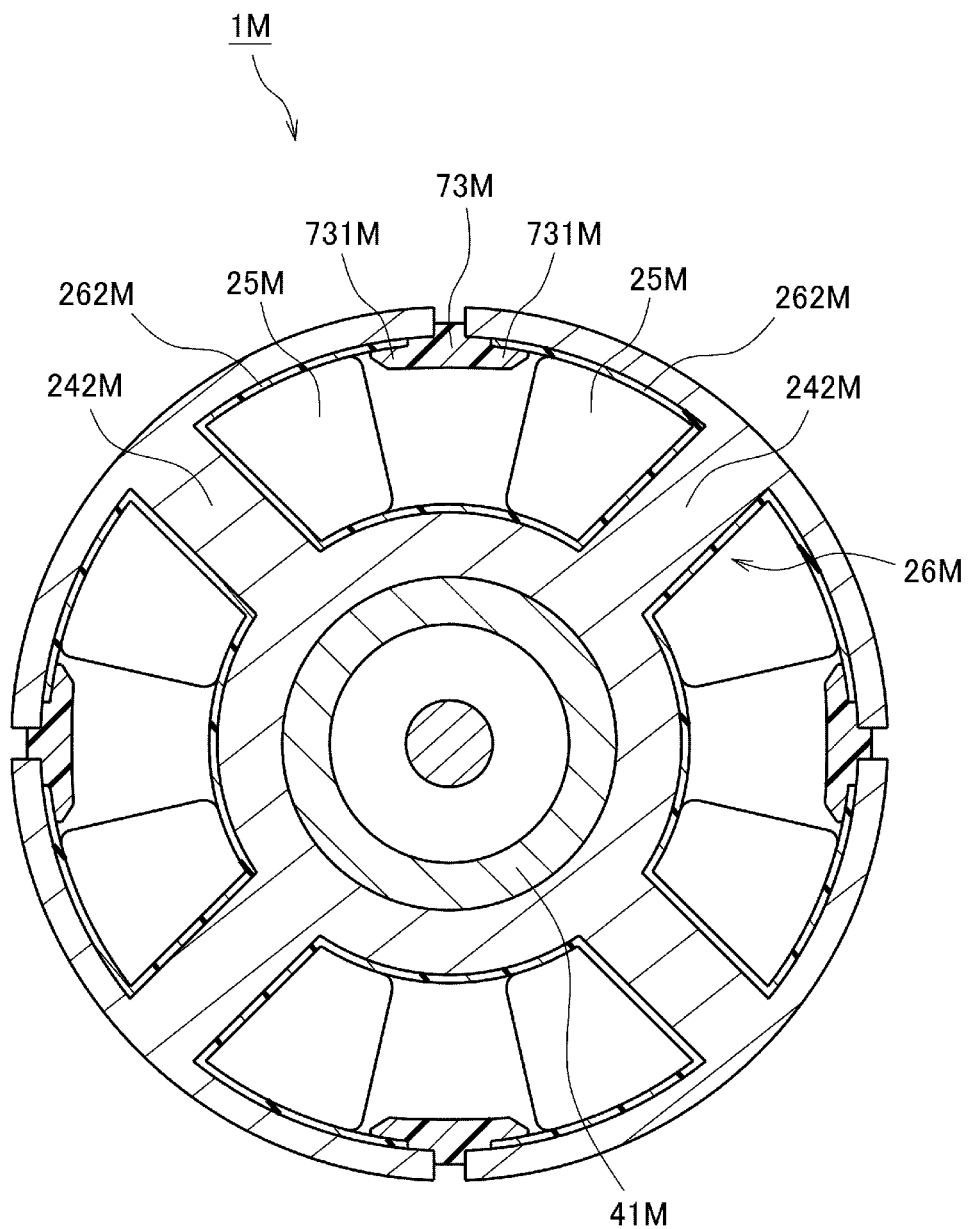
FIG. 8 is a horizontal cross-sectional view of the motor according to the third preferred embodiment.

FIG. 8 is a horizontal cross-sectional view of the motor 1M. As illustrated in FIG. 8, in the present preferred embodiment, first edge portions 262M of the insulator 26M are each arranged to extend in the circumferential direction away from a separate one of the teeth 242M on a radially outer side of the coil 25M wound on the tooth 242M. Meanwhile, the side wall portion 73M of the cover 22M includes internal cover portions 731M each of which is arranged to extend to both sides in the circumferential direction. The first edge portions 262M and the internal cover portions 731M are arranged to overlap with each other in the radial direction. In addition, radially inner surfaces of the first edge portions 262M and radially outer surfaces of the internal cover portions 731M are arranged to be in contact with each other, or arranged to be in close proximity to each other with slight gaps intervening therebetween. This contributes to more effectively preventing dust, water droplets, etc. from intruding in the vicinity of the side wall portion 73M.

Other Preferred Embodiments

While some preferred embodiments of the present invention have been described above by way of illustration, the present invention is not limited to the above-described preferred embodiments.

Figure 9:
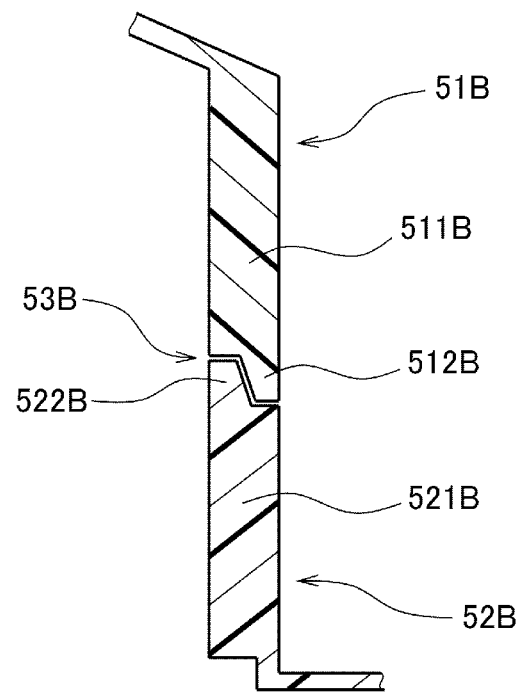
FIG. 9 is a partial vertical cross-sectional view of a first cover member and a second cover member according to a modification of the second preferred embodiment.

FIG. 9 is a partial vertical cross-sectional view of a first cover member 51B and a second cover member 52B according to a modification of the above-described second preferred embodiment. In an example of FIG. 9, a lower end portion of each of first projecting portions 511B of the first cover member 51B includes a raised portion 512B. Meanwhile, an upper end portion of each of second projecting portions 521B of the second cover member 52B includes a raised portion 522B. The raised portions 512B and 522B are arranged to overlap with each other in the radial direction at a boundary 53B between the first and second cover members 51B and 52B.

Also in this modification, a lower end portion of the first cover member 51B and an upper end portion of the second cover member 52B are arranged to overlap with each other in the radial direction at each boundary 53B. The boundary 53B is thereby made more dustproof. Note, however, that the arrangement of the above-described second preferred embodiment, in which the raised and recessed portions are mated with each other, is more preferable because multilayer radial overlapping in the above-described second preferred embodiment achieves an additional improvement in dustproofness and waterproofness.

Figure 10:
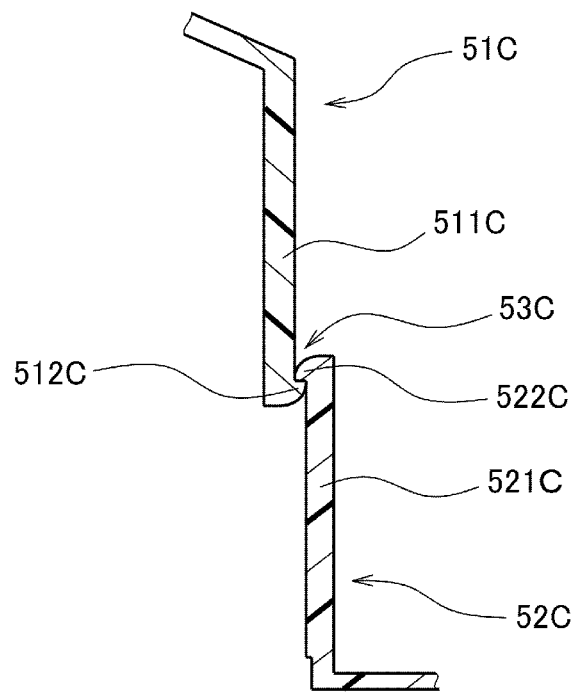
FIG. 10 is a partial vertical cross-sectional view of a first cover member and a second cover member according to a modification of the second preferred embodiment.

FIG. 10 is a partial vertical cross-sectional view of a first cover member 51C and a second cover member 52C according to another modification of the above-described second preferred embodiment. In an example of FIG. 10, a lower end portion of each of first projecting portions 511C of the first cover member 51C includes a claw portion 512C arranged to project radially outward. Meanwhile, an upper end portion of each of second projecting portions 521C of the second cover member 52C includes a claw portion 522C arranged to project radially inward. The claw portions 512C and 522C are arranged to be in engagement with each other. The first and second cover members 51C and 52C are thereby fixed to each other.

Also in this modification, a lower end portion of the first cover member 51C and an upper end portion of the second cover member 52C are arranged to overlap with each other in the radial direction at each of boundaries 53C between the first and second cover members 51C and 52C. Each boundary 53C is thereby made more dustproof. Moreover, use of the above engagement eliminates a need to use an adhesive to fix the first and second cover members 51C and 52C to each other. It is possible to fix the first and second cover members 51C and 52C to each other easily by simply bringing the first and second cover members 51C and 52C into axial engagement with each other.

Note that only one of the first and second cover members 51C and 52C may be provided with the claw portions if so desired. That is, the claw portions arranged in one of the first and second cover members 51C and 52C may be brought into engagement with receivers, such as holes or shoulders, which are arranged in the other of the first and second cover members 51C and 52C. In the example of FIG. 10, each of the claw portions 512C and 522C functions as the receiver for the other claw portion.

Figure 11:
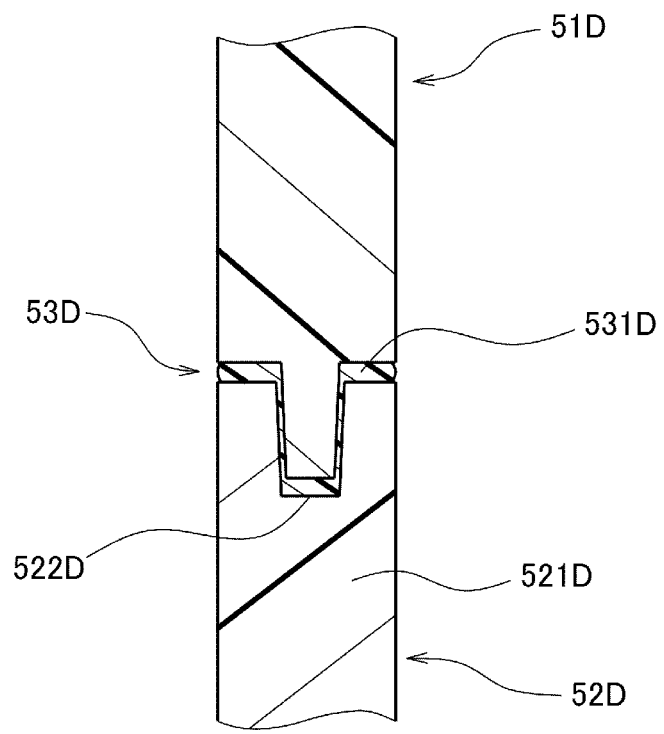
FIG. 11 is a partial vertical cross-sectional view of a first cover member and a second cover member according to a modification of the second preferred embodiment.

FIG. 11 is a partial vertical cross-sectional view of a first cover member 51D and a second cover member 52D according to yet another modification of the above-described second preferred embodiment. In an example of FIG. 11, an adhesive 531D is preferably arranged between the first and second cover members 51D and 52D. Boundaries 53D between the first and second cover members 51D and 52D are thereby made more dustproof and waterproof. Note that a moistureproof sealing agent or a water-repellent film may alternatively be arranged between the first and second cover members 51D and 52D instead of the adhesive 531D.

In the example of FIG. 11, an upper end portion of each of second projecting portions 521D of the second cover member 52D includes a recessed portion 522D. Accordingly, the adhesive 531D may be applied to an inside of the recessed portion 522D during a production process. In this case, an operation of applying the adhesive 531D can be accomplished easily.

Figure 12:
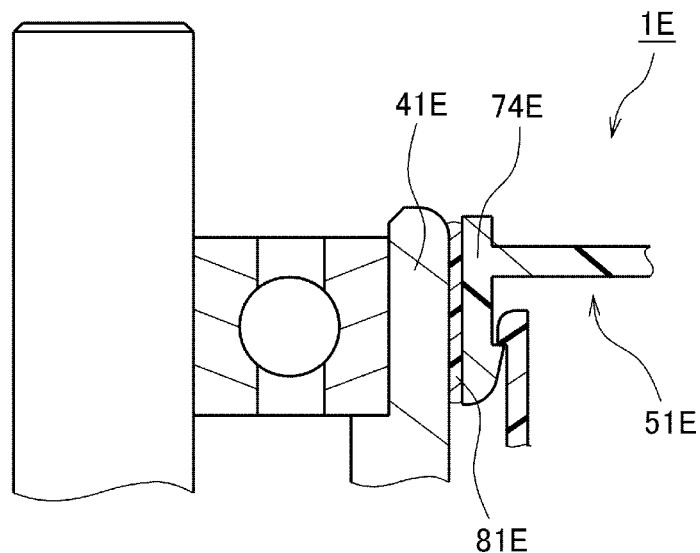
FIG. 12 is a partial vertical cross-sectional view of a motor according to a modification of the second preferred embodiment.

FIG. 12 is a partial vertical cross-sectional view of a motor 1E according to yet another modification of the above-described second preferred embodiment. In an example of FIG. 12, an adhesive 81E is arranged between a bearing support portion 41E and an inner wall portion 74E of a first cover member 51E. An additional improvement is thereby achieved in dustproofness and waterproofness of a gap between the bearing support portion 41E and the first cover member 51E. Note that a moistureproof sealing agent or a water-repellent film may alternatively be arranged between the bearing support portion 41E and the first cover member 51E instead of the adhesive 81E.

Figure 13:
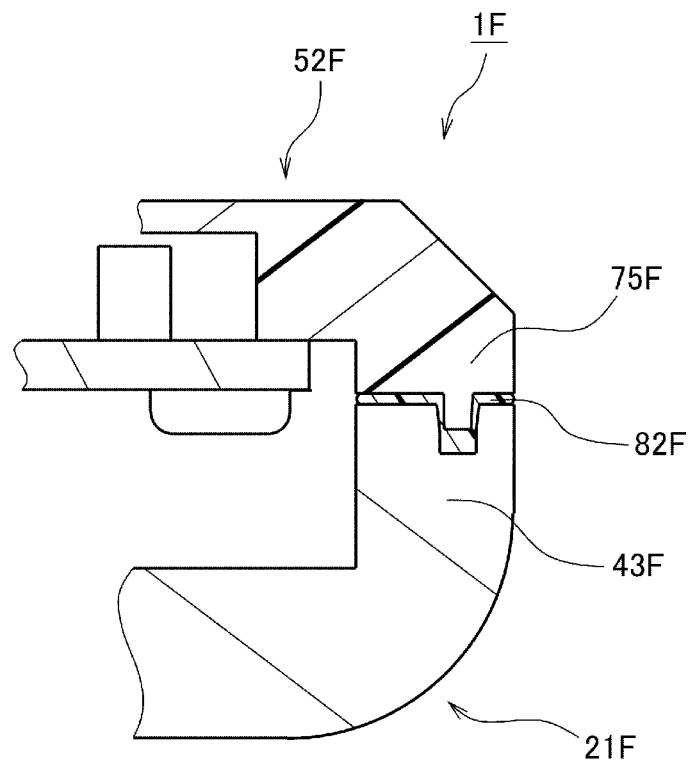
FIG. 13 is a partial vertical cross-sectional view of a motor according to a modification of the second preferred embodiment.

FIG. 13 is a partial vertical cross-sectional view of a motor 1F according to yet another modification of the above-described second preferred embodiment. In an example of FIG. 13, an adhesive 82F is preferably arranged between an annular edge portion 75F of a second cover member 52F and an annular rest portion 43F of a housing 21F. An additional improvement is thereby achieved in dustproofness and waterproofness of a gap between the second cover member 52F and the housing 21F. Note that a moistureproof sealing agent or a water-repellent film may alternatively be arranged between the second cover member 52F and the housing 21F instead of the adhesive 82F.

Also note that, similarly, an adhesive, a moistureproof sealing agent, or a water-repellent film may be arranged in a boundary between the cover and the insulator.

Figure 14:
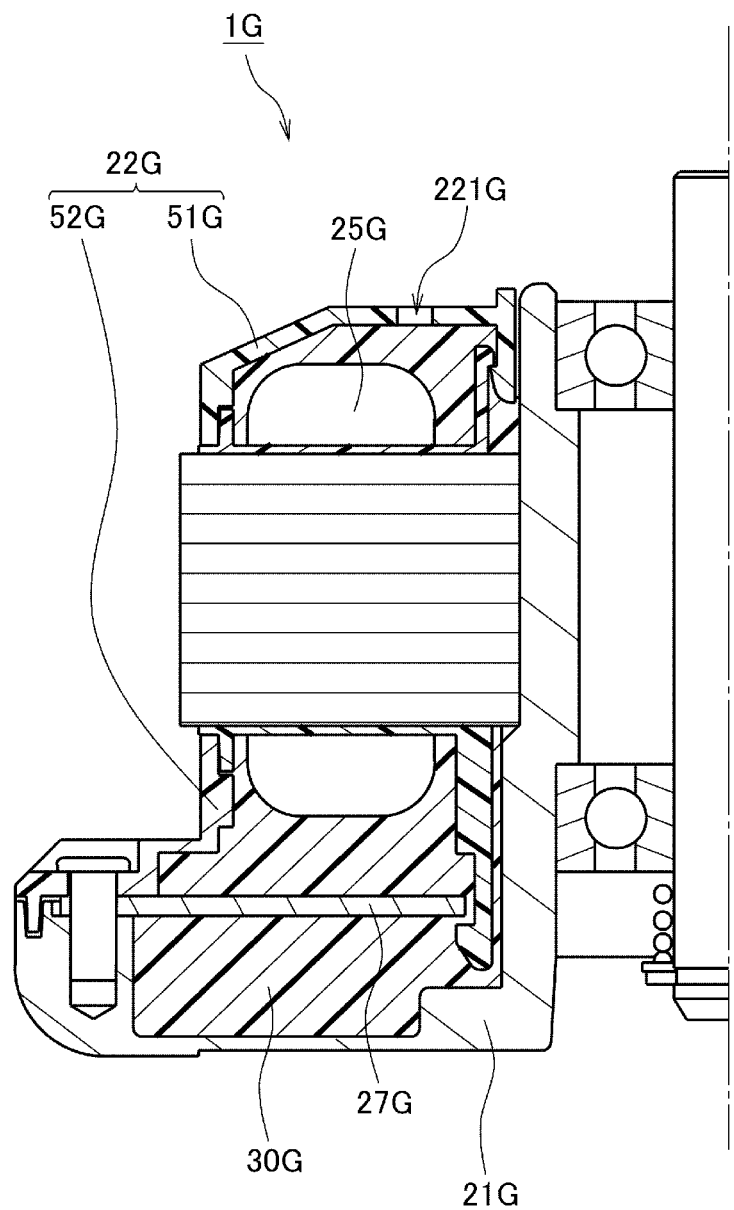
FIG. 14 is a partial vertical cross-sectional view of a motor according to a modification of the second preferred embodiment.

FIG. 14 is a partial vertical cross-sectional view of a motor 1G according to yet another modification of the above-described second preferred embodiment. In an example of FIG. 14, an annular space enclosed by a housing 21G and a cover 22G is filled with a filler 30G. Coils 25G and a circuit board 27G are thereby protected more effectively from dust, water droplets, etc. In particular, in the example of FIG. 14, a first cover member 51G preferably includes a through hole 221G. Therefore, it is possible to inject the filler 30G into an inside of the cover 22G through the through hole 221G after attachment of the first cover member 51G and a second cover member 52G. Thus, the coils 25G and the circuit board 27G can be easily coated with the filler 30G inside the cover 22G.

A silicone adhesive, an epoxy resin, a silicone rubber, a polyurethane resin, or the like, for example, may be used as the filler 30G. In particular, use of a material that can be injected in a fluid state and then hardened after the injection makes it possible to provide dustproofness and waterproofness after the injection while at the same time facilitating an operation of the injection.

Note, however, that in the case where there is a demand for decreased pressure on the circuit board and the coils or for improved heat dissipation, it is preferable that the filler 30G should be omitted to secure spaces around the circuit board and the coils.

Figure 15:
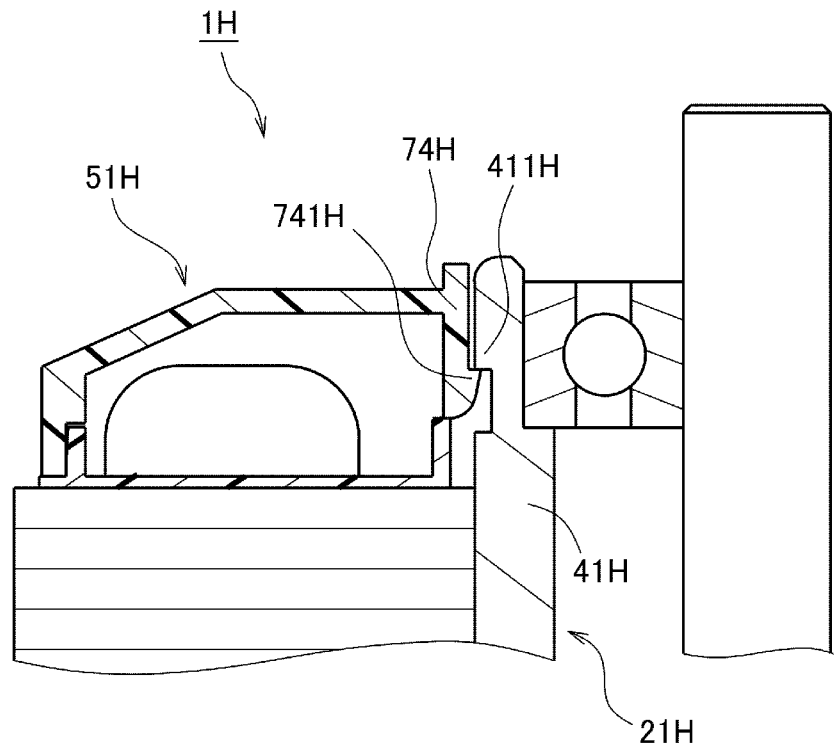
FIG. 15 is a partial vertical cross-sectional view of a motor according to a modification of the second preferred embodiment.

FIG. 15 is a partial vertical cross-sectional view of a motor 1H according to yet another modification of the above-described second preferred embodiment. In an example of FIG. 15, a lower end portion of an inner wall portion 74H of a first cover member 51H includes a claw portion 741H arranged to project radially inward. Meanwhile, an outer circumferential surface of a bearing support portion 41H preferably includes a claw portion 411H arranged to project radially outward in the vicinity of an upper end portion of the bearing support portion 41H. The claw portions 741H and 411H are arranged in engagement with each other. The first cover member 51H and the bearing support portion 41H are thereby fixed to each other. Use of the above engagement makes it possible to fix the first cover member 51H and a housing 21H to each other easily by simply bringing the first cover member 51H and the housing 21H into axial engagement with each other.

Note that only one of the first cover member 51H and the bearing support portion 41H may be provided with the claw portion. That is, the claw portion arranged in one of the first cover member 51H and the bearing support portion 41H may be brought into engagement with a receiver, such as a hole or a shoulder, which is arranged in the other of the first cover member 51H and the bearing support portion 41H. In the example of FIG. 15, each of the claw portions 741H and 411H functions as the receiver for the other claw portion.

Figure 16:
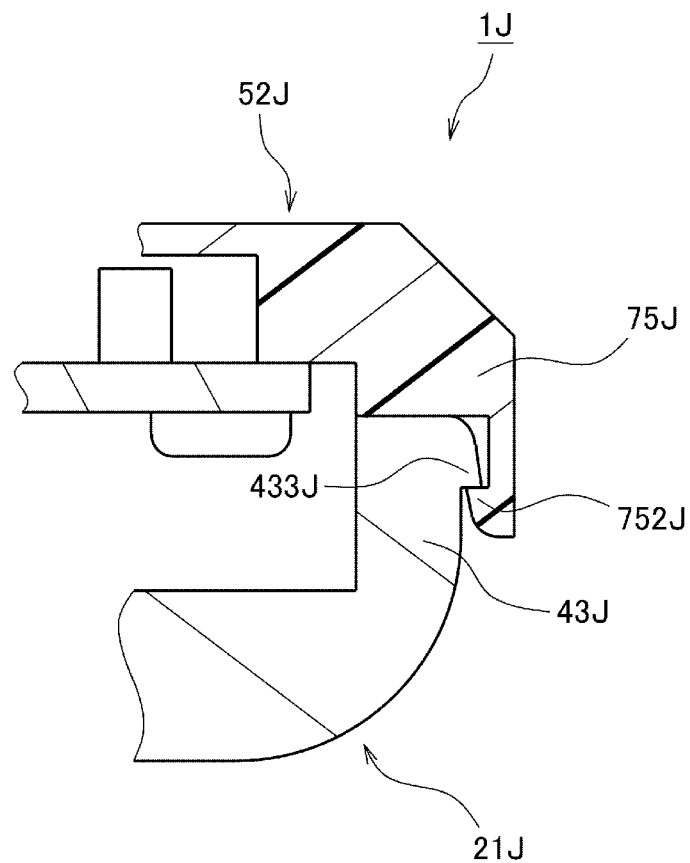
FIG. 16 is a partial vertical cross-sectional view of a motor according to a modification of the second preferred embodiment.

FIG. 16 is a partial vertical cross-sectional view of a motor 1J according to yet another modification of the above-described second preferred embodiment. In an example of FIG. 16, a lower end portion of an annular edge portion 75J of a second cover member 52J is arranged to extend downward along an outer circumferential surface of an annular rest portion 43J of a housing 21J. In addition, the lower end portion of the annular edge portion 75J includes a claw portion 752J arranged to project radially inward. Meanwhile, the outer circumferential surface of the annular rest portion 43J includes a claw portion 433J arranged to project radially outward. The claw portions 752J and 433J are arranged in engagement with each other. The second cover member 52J and the housing 21J are thereby fixed to each other. Use of the above engagement makes it possible to fix the second cover member 52J and the housing 21J to each other easily by simply bringing the second cover member 52J and the housing 21J into axial engagement with each other.

Note that only one of the second cover member 52J and the housing 21J may be provided with the claw portion. That is, the claw portion arranged in one of the second cover member 52J and the housing 21J may be brought into engagement with a receiver, such as, for example, a hole or a shoulder, which is arranged in the other of the second cover member 52J and the housing 21J. In the example of FIG. 16, each of the claw portions 752J and 433J functions as the receiver for the other claw portion.

A variety of other modifications of the above-described preferred embodiments are also conceivable. For example, another member may be arranged to intervene between the first cover member and the bearing support portion. That is, the inner circumferential portion of the first annular portion of the cover may be arranged to be in contact with a member directly or indirectly fixed to the bearing support portion, or arranged to be in close proximity to this member with a slight gap intervening therebetween.

Also note that, in a modification of the above-described second preferred embodiment, an additional member may be arranged to intervene between the second cover member and the housing. That is, the outer circumferential portion of the second annular portion of the cover may be arranged to be in contact with a member directly or indirectly fixed to the base portion of the housing, or arranged to be in close proximity to this member with a slight gap intervening therebetween. Also note that, in a modification of the above-described third preferred embodiment, the inner circumferential portion of the second annular portion may be arranged to be in contact with the outer circumferential surface of the bearing support portion, or arranged to be in close proximity to the outer circumferential surface of the bearing support portion with a slight gap intervening therebetween.

Also note that each of the first and second cover members may be arranged to be in contact with or in close proximity to the stator core without intervention of the insulator. Note, however, that it is easier to realize a structure to achieve connection with the first and second cover members in the insulator, which is made of the resin, than in the stator core, which is made of a magnetic material. Therefore, connecting each of the first and second cover members to the insulator is preferred because of relative ease in realizing the structure to achieve the connection in the insulator.

Figure 17:
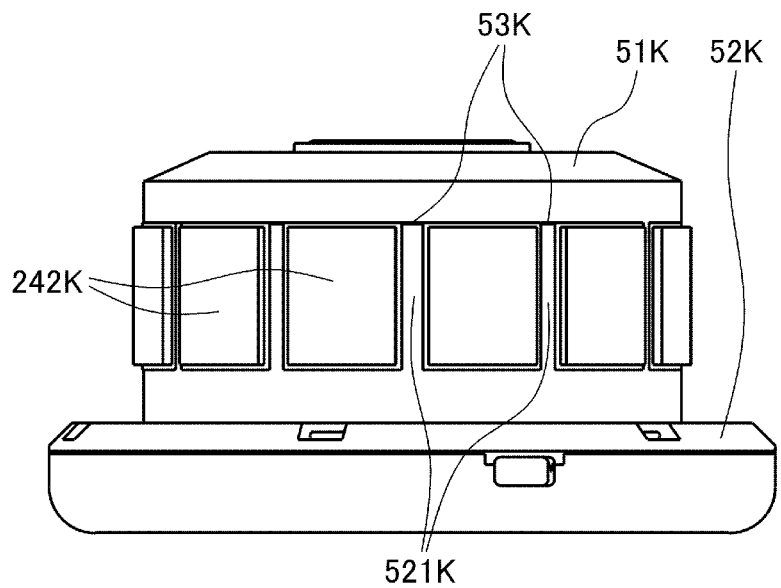
FIG. 17 is a side view of a stationary portion according to a modification of the second preferred embodiment.
Figure 18:
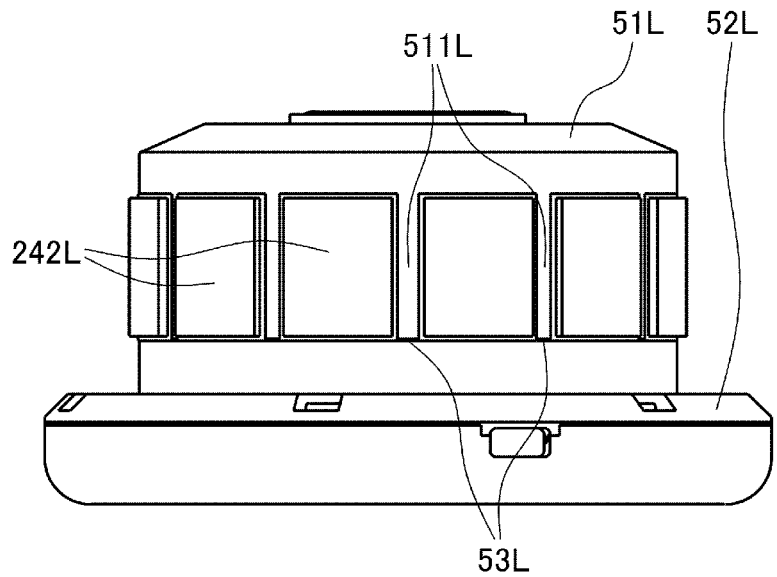
FIG. 18 is a side view of a stationary portion according to a modification of the second preferred embodiment.

Also note that the boundaries between the first and second cover members may not necessarily be arranged between the teeth. For example, as illustrated in FIG. 17, it may be arranged such that, of a first cover member 51K and a second cover member 52K, only the second cover member 52K includes projecting portions 521K, and boundaries 53K between the first and second cover members 51K and 52K are arranged at substantially the same axial height as that of an upper end portion of each of teeth 242K. Also, as illustrated in FIG. 18, it may be so arranged that, of a first cover member 51L and a second cover member 52L, only the first cover member 51L includes projecting portions 511L, and boundaries 53L between the first and second cover members 51L and 52L are arranged at substantially the same axial height as that of a lower end portion of each of teeth 242L. Also note that the cover may be made up of only one member, or of more than two members.

Note that features of the above-described preferred embodiments and the modifications thereof may be combined appropriately as long as no conflict arises.

Preferred embodiments of the present invention are applicable to motors of various types.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A motor comprising:
    a stationary portion; and
    a rotating portion supported to be rotatable with respect to the stationary portion; wherein
    the rotating portion includes:
        a shaft arranged to extend along a central axis extending in a vertical direction;
        a rotor holder including a cylindrical portion arranged to be coaxial or substantially coaxial with the central axis; and
        a rotor magnet arranged on an inner circumferential surface of the cylindrical portion;
    the stationary portion includes:
        a plurality of teeth arranged radially inward of the rotor magnet, and arranged to extend radially with respect to the central axis;
        coils each of which is wound on a separate one of the teeth;
        a bearing portion arranged to rotatably support the shaft;
        a bearing support portion arranged to hold the bearing portion;

a base portion arranged to extend radially outward from
the bearing support portion below the coils;
a circuit board arranged on an upper portion of the base
portion; and
a cover made of a resin material;
the cover includes:
a first annular portion arranged above the coils to extend
in an annular shape;
a side wall portion arranged to extend axially downward
from an outer circumferential portion of the first
annular portion; and
a second annular portion arranged to extend radially
outward or radially inward from a lower end portion
of the side wall portion along an upper surface of the
circuit board;
an inner circumferential portion of the first annular portion
and one of the bearing support portion and a member
directly or indirectly fixed to the bearing support portion
are arranged to be in contact with each other, or in close
proximity to each other with a slight gap intervening
therebetween;
the second annular portion and one of the base portion, the
bearing support portion, and a member directly or indirectly fixed to one of the base portion and the bearing
support portion are arranged to be in contact with each
other, or in close proximity to each other with a slight
gap intervening therebetween;
the side wall portion is arranged to extend in an axial
direction while filling in or substantially filling in gaps
between the teeth on a radially inner side of radially
outer end surfaces of the teeth; and
the cover member is defined by at least a first cover member
and a second cover member, the first cover member and
the second cover member including radially overlapping
end portions between the teeth.

2. The motor according to claim 1, wherein
the first cover member includes the first annular portion
and an upper portion of the side wall portion;
the second cover member includes the second annular portion and a lower portion of the side wall portion; and
boundaries are provided between the first and second cover
members, the boundaries belong to the side wall portion,
and the boundaries are arranged in the gaps between the
teeth.

3. The motor according to claim 2, wherein each of the
boundaries is arranged at the same height or at substantially
the same height as that of an axial middle of each of the teeth.

4. The motor according to claim 1, wherein
the first cover member includes the first annular portion
and an upper portion of the side wall portion;
the second cover member includes the second annular portion and a lower portion of the side wall portion; and
boundaries are provided between the first and second cover
members, the boundaries belong to the side wall portion,
and the boundaries are arranged at the same height or at
substantially the same height as that of an upper end
portion or a lower end portion of each of the teeth.

5. The motor according to claim 2, wherein the first and
second cover members are arranged to overlap with each
other in a radial direction at each of the boundaries.

6. The motor according to claim 5, wherein
one of the first and second cover members includes raised
portions, while the other of the first and second cover
members includes recessed portions; and
the raised portions and the recessed portions are mated
with each other at the boundaries.

7. The motor according to claim 2, further comprising one
of an adhesive, a moistureproof sealing agent, and a water-repellent film arranged to intervene between the first and
second cover members at each of the boundaries.

8. The motor according to claim 2, wherein
one of the first and second cover members includes claw
portions, while the other of the first and second cover
members includes receivers; and
the claw portions and the receivers are arranged in engagement with each other at the boundaries.

9. The motor according to claim 1, further comprising an
insulator made of a resin material, and arranged to intervene
between the teeth and the coils.

10. The motor according to claim 9, wherein
the insulator includes first edge portions each arranged to
extend away from a separate one of the teeth on a radially
outer side of the coil wound on the tooth; and
each of the first edge portions and a portion of the side wall
portion are arranged to overlap with each other in a
radial direction.

11. The motor according to claim 9, wherein
the insulator includes a second edge portion arranged to
extend upward above an upper surface of each tooth on
a radially inner side of the coil wound on the tooth;
the cover includes an inner wall portion arranged to extend
downward from an inner circumferential portion of the
first annular portion; and
the second edge portion and the inner wall portion are
arranged to overlap with each other in a radial direction.

12. The motor according to claim 1, further comprising a
filler arranged to fill a space enclosed by the bearing support
portion, the base portion, and the cover.

13. The motor according to claim 12, wherein the cover
includes a through hole.

14. The motor according to claim 12, wherein the filler is a
material which has been hardened after being filled into the
space in a fluid state.

15. The motor according to claim 1, further comprising one
of an adhesive, a moistureproof sealing agent, and a water-repellent film arranged to intervene between the cover and the
bearing support portion.

16. The motor according to claim 1, wherein
one of the cover and the bearing support portion includes a
claw portion, while the other of the cover and the bearing
support portion includes a receiver; and
the claw portion and the receiver are arranged in engagement with each other in a vicinity of an upper end portion
of the bearing support portion.

17. The motor according to claim 1, further comprising
waterproof films each arranged to cover the radially outer end
surface of a separate one of the teeth.

18. The motor according to claim 1, wherein a radially
outer edge portion of the first annular portion is recessed
radially inward at positions above the gaps between the teeth.

19. The motor according to claim 1, wherein
the second annular portion is arranged to extend radially
outward from the lower end portion of the side wall
portion; and
an outer circumferential portion of the second annular portion and one of the base portion and a member directly or
indirectly fixed to the base portion are arranged to be in
contact with each other, or arranged to be in close proximity to each other with a slight gap intervening therebetween.

20. The motor according to claim 19, further comprising a
screw arranged to fix both of the circuit board and the second
annular portion to an upper surface of the base portion.

21. The motor according to claim 20, wherein the upper surface of the circuit board and a lower surface of the second annular portion are arranged to be in surface contact with each other around the screw.

22. The motor according to claim 19, further comprising at least one of an adhesive, a moistureproof sealing agent, and a water-repellent film arranged to intervene between the cover and the base portion.

23. The motor according to claim 19, wherein
one of the cover and the base portion includes a claw portion, while the other of the cover and the base portion includes a receiver; and
the claw portion and the receiver are arranged in engagement with each other in a vicinity of an outer circumferential portion of the base portion.

24. The motor according to claim 1, wherein
the second annular portion is arranged to extend radially inward from the lower end portion of the side wall portion; and
an inner circumferential portion of the second annular portion and one of the bearing support portion and a member directly or indirectly fixed to the bearing support portion are arranged to be in contact with each other, or in close proximity to each other with a slight gap intervening therebetween.

25. The motor according to claim 24, further comprising an insulator attached to the teeth, wherein the coils are accommodated in a closed space or a substantially closed space defined by the insulator and the cover.

26. The motor according to claim 24, further comprising a potting material arranged to cover the circuit board.

27. The motor according to claim 26, wherein the base portion further includes a bank portion arranged to surround the potting material.

28. The motor according to claim 27, wherein
the rotating portion further includes:
a cup portion arranged to cover the rotor holder; and
an impeller arranged on an outer circumference of the cup portion;
the bank portion is arranged in an annular shape; and
the bank portion and the cup portion are arranged to overlap with each other in a radial direction.

* * * * *